United States Patent [19]

Quinlan et al.

[11] 4,029,613
[45] June 14, 1977

[54] ANTILUMPING EXPANDING STYRENE POLYMERS

[75] Inventors: John J. Quinlan, Atco, N.J.; James J. Garland; Jose E. Granda, both of Aliquippa, Pa.

[73] Assignee: ARCO Polymers, Inc., Philadelphia, Pa.

[22] Filed: Dec. 29, 1975

[21] Appl. No.: 644,355

[52] U.S. Cl. .................. 260/2.5 B; 260/42.43; 428/407
[51] Int. Cl.² .................................... C08J 9/22
[58] Field of Search ..................... 260/2.5 B

[56] References Cited

UNITED STATES PATENTS

| | | | |
|---|---|---|---|
| 2,861,898 | 11/1958 | Platzer | 260/2.5 B |
| 3,304,274 | 2/1967 | Eng | 260/2.5 B |
| 3,444,104 | 5/1969 | Immel | 260/2.5 B |

*Primary Examiner*—Morton Foelak
*Attorney, Agent, or Firm*—Lewis J. Young

[57] ABSTRACT

Expandable styrene polymer particles are surface-coated with calcium polysilicate to prevent the particles from lumping together during expansion. The coating is applied by adding 0.02–0.05 part of calcium polysilicate to an aqueous suspension containing 100 parts of polymer particles subsequent to impregnating the mixture with a blowing agent, or by dry-blending polymer particles with the polysilicate.

2 Claims, No Drawings

ANTILUMPING EXPANDING STYRENE POLYMERS

BACKGROUND OF THE INVENTION

This invention relates to a process for making expandable styrene polymer particles non-lumping on pre-expansion.

The making of low density, cellular, shaped, plastic articles from expandable particles of styrene polymers is well-known. Such particles generally contain a blowing agent which boils below the softening point of the polymer and which will cause the particles to expand when they are heated.

The particles are generally pre-expanded before introduction into the mold to provide better fusion and less density variation in the molded article. Such a pre-expansion is described in U.S. Pat. No. 3,023,175 and 3,577,360.

These pre-expanded particles are placed into a mold cavity which defines the shape of the desired finished articles. The particles are heated above their softening point, whereupon the particles expand to fill the mold cavity and fuse together.

An undesirable result of the pre-expansion before introduction into the mold is the tendency of the pre-expanded particles to clump together and form lumps which render the particles unsuitable for molding. These lumps cannot be properly conveyed in processing plants and are unsuitable for charging into molds of intricate contour due to improper fill-out of the molded articles. Even if reasonable fill-out is achieved, variations in density within the molded article can result and voids also occur.

Various methods have been proposed for the prevention of lumping during pre-expansion, but these have all suffered from some objectionable feature such as rapid loss of blowing agent, poor flow of the treated beads, dust problems which cause plugging of the steam ports, and often various reduction in fusion of the particles on molding. U.S. Pat. No. 3,520,833, teaches the addition of lecithin during the impregnation of the particles with the blowing agent. Unfortunately the lecithin imparts an undesirable odor to the molded articles. U.S. Pat. No. 3,462,293, teaches to coat the particles with polymeric materials by a fluid bed process. This process involves an additional expense of fluidizing the particles and coating with the polymer latexes. U.S. Pat. No. 3,444,104, teaches the addition of calcium silico aluminate. This additive does not allow pre-puff of less than about 1 pound per cubic foot density to be prepared.

SUMMARY OF THE INVENTION

It has now been found that anti-lumping, pre-expanded particles have density of less than 0.90 pcf. are produced by coating styrene polymer particles with a calcium polysilicate applied to the particles by dry-blending techniques or an aqueous suspension after impregnating the particles with expanding agent. The suitable polysilicate analyzes as 73–83 weight % $SiO_2$, 3–7 weight % CaO, less than 1 weight % $Al_2O_3$ and the remainder as water.

DETAILED DESCRIPTION OF THE INVENTION

In accordance with this invention, a variety of expandable thermoplastic homopolymers and copolymers can be rendered anti-lumping. The polymers may be derived from vinyl aromatic monomers including styrene, vinyltoluene, isopropylstyrene, alpha-methylstyrene, nuclear methyl styrenes, chlorostyrene, tert-butylstyrene, etc., as well as copolymers prepared by the copolymerization of a vinyl aromatic monomer with monomers such as butadiene, alkyl methacrylates, alkyl acrylates, acrylonitrile and maleic anhydride wherein the vinyl aromatic monomer is present in at least 50% by weight of the copolymer. For the purpose of convenience, these polymers and copolymers are referred to herein as styrene polymers.

The styrene polymers can, of course, be produced by any of the known techniques, for example by suspension or mass polymerization, to obtain particles in the form of beads or pellets.

To render the polymer particles expandable, the blowing agent is incorporated into the particles, as in U.S. Pat. No. 2,983,692, by suspending the particles in water with the aid of suspending agent systems such as tricalcium phosphate in combination with an anionic surfactant.

The blowing agents are compounds which are gases or which will produce gases on heating. Preferred blowing agents include aliphatic hydrocarbons containing from 4–7 carbon atoms in the molecule, such as butane, pentane, cyclopentane, hexane, heptane, cyclohexane, and the halogenated hydrocarbons which boil at a temperature below the softening point of the polymer. Mixtures of these agents may also be used, such as a mixture of 40–60% n-pentane and 60–40% trichlorofluoromethane. Usually from 3 to 20% of blowing agent per 100 parts of polymers is incorporated by the impregnation.

The impregnation is conventionally carried out at temperatures ranging from about 60° to 150° C. Increasing the temperature makes the impregnation proceed at a faster rate.

After the impregnation is completed, the suspension of polymer particles is cooled to room temperatures to allow separation of the impregnated beads from the aqueous phase.

The hydrated calcium polysilicate useful in this invention is a finely divided powder consisting of 73–83 weight % of silicon dioxide, 3–7 weight % of calcium oxide, less than 1 weight % of aluminum oxide, and the remaining 9–20 weight % being water. The polysilicate is useful in amounts of from 0.02 to 0.05 part per 100 parts of polymer particles (0.02–0.05 weight % based on polymer weight).

The expandable styrene polymer particles can be coated with the hydrated calcium polysilicate in any convenient manner, for example, by dry blending the polymer particles with the polysilicate in conventional dry blending equipment. In another method, the polysilicate can be added to the aqueous suspension of expandable polymer particles in which the particles were initially prepared. Further, the dried polymer particles from any type of polymerization can be suspended in aqueous medium to be impregnated with blowing agent, and the polysilicate added to this suspension slurry after impregnation but prior to separation of the impregnated particles.

The coated, impregnated particles are separated from the aqueous phase by the usual means, such as filtration a careful manner so as not to remove the coating from the beads. The particles are then dried in air.

It will be obvious to those skilled in the art that the coating process of the present invention may also be applied to polymer particles which contain various other additives, such as dyes, pigments, self-extinguishing agents, anti-static agents, plasticizers or the like.

The invention is further illustrated by the following examples wherein parts are parts by weight unless otherwise indicated.

EXAMPLE I

Expandable polystyrene beads were prepared by adding to a reactor equipped with a three-bladed impeller in the following order, with stirring 100 parts of styrene, 0.33 part of a catalyst (consisting of 0.23 part of benzoyl peroxide and 0.10 part of t-butyl perbenzoate), 108 parts of water, 0.05 part of a buffer tetrasodium pyrophosphate, and the reactor was heated to 92° C over 1.5 hours. Then, 0.150 part of a suspending agent, hydroxyethyl cellulose, was added and the mixture maintained at 92° C for an additional 3.5 hours. Thereafter, 0.2 part of a dispersing agent, Tween 20 (polyoxyethylene sorbitan monolaurate) and over a period of 1.5 hours 8.5 parts of the blowing agent, n-pentane, were added. The temperature of the suspension was then raised to 115° C over a period of 0.5 hour and maintained at 115° C for an additional 4 hours to complete the polymerization of the monomer and the impregnation of the blowing agent into the particles. The slurry was divided into aliquots A and B.

EXAMPLE II

Aliquot A of Example I was divided into five portions. One portion A1 was set aside. To the second portion A2 there was added 0.02 part per 100 parts of polymer of the anti-lumping agent of U.S. Pat. No. 3,444,104, amorphous hydrated calcium silico aluminate (50% $SiO_2$, 67% $Al_2O_3$, 30% CaO, 13% $H_2O$), and the slurry was stirred with a three-bladed impellor for 15 minutes to thoroughly coat the particles with the anti-lumping agent. The particles were then dewatered, and air dried. To the third portion, A3, there are added 0.04 part per 100 parts of polymer of the same aluminate, anti-lumping agent and the slurry was stirred for 15 minutes after which the particles were dewatered, and air dried. To the fourth portion A4, there was added 0.02 part per 100 parts of polymer of the anti-lumping agent of the present invention, i.e., a hydrated calcium polysilicate (83% $SiO_2$, <1% $Al_2O_3$, 7% CaO, >9% $H_2O$), and the slurry was stirred for 15 minutes after which the particles were dewatered, and air dried. To the fifth portion A5, there was added 0.04 part per 100 parts of polymer of the same polysilicate, the slurry stirred for 15 minutes and the polymer particles recovered as before. Each portion A1 through A5 was separately pre-expanded in a Rodman pre-expander as described in U.S. Pat. No. 3,023,175 using in each case a steam pressure of 20 psig and feed rate of 200 lbs./hr. The pre-expanded beads having a bulk density of 1.5 lbs./cu. ft. were recovered from the bead hopper, were allowed to air dry in paper containers for approximately 18 hours, and then were screened through a No. 3½ mesh U.S. Standard Sieve. The percent lumping was determined from the weight of the beads which were retained on the screen. Portion A1, the beads containing no anti-lumping agent, had 3 percent by weight of lumps. Portions A2 and A3, the beads containing respectively 0.02 and 0.04 percent by weight of calcium silico aluminate, each had 0.1 percent by weight of lumps. Portions A4 and A5, the beads containing respectively 0.02 and 0.04 percent by weight of calcium polysilicate, each had no lumps. Some of each portion of the pre-expanded beads were placed in individual 5 × 5 × ⅝ inch molds and the molds placed between the platens of a conduction press heated to a temperature of 250° F where the beads were heated to expand them and cause them to fuse together. The bead-to-bead fusion of the foam block which had a density of 1.2 lbs./cu.ft. was excellent in each case.

EXAMPLE III

Aliquot B of Example I was centrifuged to remove the aqueous medium. The beads were washed with water and air dried on trays. The expandable polystyrene beads of aliquot B were divided into five portions. The portion B1 was set aside. To the other four portions, B2, B3, B4 and B5, were added the amounts of anti-lumping agents which are shown in Table I and each portion of polystyrene and anti-lumping agent were thoroughly mixed in a ribbon blender for 5 minutes. Each portion was separately expanded in the Rodman pre-expander at a steam pressure of 20 psig at a rate of 400 lbs./hr. to a bulk density of about 1.70 lbs./cu.ft. The amount of lumps as determined by the procedure of Example II is recorded in Table I. The portions of the pre-expanded beads were placed in individual 5 × 5 × ⅝ inch molds and the molds placed between the platens of a conduction press at a temperature of 250° F where the beads were heated to expand them and cause them to fuse together. Fusion was good in all cases.

Table I

| Portion | Additive (wt. %) | % lumps |
|---|---|---|
| B1 | — | 5.0 |
| B2 | aluminate[a] (0.02) | 0.8 |
| B3 | aluminate[a] (0.04) | 0.5 |
| B4 | polysilicate[b] (0.02) | 0.1 |
| B5 | polysilicate[b] (0.04) | 0.0 |

[a] calcium silico aluminate from U.S. 3,444,104
[b] calcium polysilicate from this invention

EXAMPLE IV

To illustrate the great improvement of the polysilicate agent of the present invention over the aluminate previously known from U.S. Pat. No. 3,444,104, the polymer beads coated as in Example III were subjected to vacuum pre-expansion according to the process of U.S. Pat. No. 3,577,360 as follows:

The coated polymer beads were placed in a 25 gallon cylindrical horizontal ribbon blender designed for vacuum and jacketed for steam heating. One pound samples of the coated polymer beads were placed in the blender for the times indicated in Table II at 240° F. and subjected to a vacuum equal to 25 inches of mercury, then the vacuum vented during a 10 second period followed by bead discharge. The percent lumps were determined by screening, where possible, as in Example II. Sample 1 contained no additive. Samples 2 and 3 contained the calcium silico aluminate in concentrations of 0.02 and 0.04 weight % based on polymer respectively. Samples 4 and 5 contained the calcium polysilicate in 0.02 and 0.04 weight % concentration, respectively.

Table II

| Time (min.) | 1 pcf | 1 % lumps | 2 pcf | 2 % lumps | 3 pcf | 3 % lumps | 4 pcf | 4 % lumps | 5 pcf | 5 % lumps |
|---|---|---|---|---|---|---|---|---|---|---|
| 1.50 | — | 100 | 1.5 | 0 | — | — | — | — | — | — |
| 1.75 | — | — | — | plugged | — | — | — | — | — | — |
| 2.25 | — | — | — | — | 0.98 | 0 | — | — | — | — |
| 2.50 | — | — | — | — | — | plugged | 0.87 | 0 | 0.85 | 0 |

From Table II it can be seen that the anti-lump agent of U.S. Pat. No. 3,444,104 is ineffective after 1.75 minutes at 0.02 weight % and after 2.5 minutes at 0.04 weight %. Although the aluminate was anti-lumping at 2.25 minutes at 0.04 concentration, the density of the pre-puff was still greater than 0.90 pcf. The polysilicate of the present invention, however, gave, after 2.5 minutes, pre-puff having densities less than 0.90 pcf and no lumping.

We claim:

1. Expandable styrene polymer particles which will not lump during pre-expansion, comprising styrene polymer particles containing a blowing agent and having on their surface from 0.02 to 0.05 percent by weight based on polymer of hydrated calcium polysilicate consisting of 73–83 percent by weight of silicon dioxide, less than 1 percent by weight aluminum oxide, 3–7 percent by weight of calcium oxide, and 9–20 percent by weight water.

2. The composition of claim 1 wherein said styrene polymer is polystyrene.

* * * * *